Patented Oct. 6, 1936

2,056,911

UNITED STATES PATENT OFFICE 2,056,911

PRODUCTION OF HYDROGEN FROM HYDROCARBONS

Georg Schiller and Gustav Wietzel, Mannheim, Germany, assignors to I. G. Farbenindustrie Aktiengesellschaft, Frankfort-on-the-Main, Germany No Drawing. Application January 11, 1932, Serial No. 586,068. In Germany January 17, 1931

8 Claims. (Cl. 23—212)

The present invention relates to improvements in the production of hydrogen from hydrocarbons.

It has already been proposed to prepare hydrogen by the conversion of methane and other hydrocarbons in the gaseous phase with steam or gases containing the same. When this reaction proceeds for example in the presence of an activated nickel catalyst, temperatures of from 600° to 1000° C. are sufficient. The supply of the necessary reaction heat may be effected in a periodic manner, as for example with the aid of heat accumulators; continuous operation may be effected for example by the addition of oxygen or air or by heating the reaction chamber externally. In the latter case it is preferable to employ tubes or other long vessels of material which is stable to heat and which has a good thermal conductivity. When working in this way, the employment of activated catalysts is of especial importance in order to be able to prepare large amounts of hydrogen in small reaction chambers at the lowest possible temperatures. If gaseous or vaporous unsaturated hydrocarbons or saturated hydrocarbons of higher molecular weight than methane, which may also contain methane, or gases which contain such hydrocarbons, as for example cracking gases, low-temperature carbonization gases, waste gases from the destructive hydrogenation of coals, tars, oils and the like, be employed as the initial materials it is found that after some time soot separates on the activated catalysts hitherto used, and this renders the catalysts inactive and hinders the passage of gas. Even if the soot can be removed again by treatment with steam or by other suitable methods, the deposits are nevertheless very troublesome, so that it has been proposed to subject the gases to inconvenient pretreatments, as for example conversion of the higher hydrocarbons into methane and other methods. The said gaseous or vaporous hydrocarbons are hereinafter referred to as vaporized hydrocarbons.

We have found that the formation of carbon black takes place mainly at those places in the reaction chamber where the speed of reaction, especially the rate of conversion of the higher and unsaturated hydrocarbons, is very great. Up to a certain point, the speed of reaction may be controlled by the nature of the heating or by diluting the gases by the addition of large amounts of steam and by varying the speed of flow of the gases, but these measures are usually not sufficient.

On the basis of this discovery we have now found that very excellent results are obtained in the production of hydrogen from vaporized hydrocarbons having a higher molecular weight than methane without the formation of soot by employing at least two catalysts of different catalytic activity arranged one behind another. By the suitable selection of the catalysts the speed of reaction may be so readily influenced that the reaction is uniformly distributed over the whole length of the layer of the catalysts. It is preferable to select the catalysts in such a manner that at the beginning of the layer the higher molecular and unsaturated hydrocarbons are converted, the lower molecular saturated hydrocarbons and the methane being converted towards the end of the layer. It has been found that the higher molecular and unsaturated hydrocarbons can be converted without the formation of soot by catalysts which are less active than those which are suitable for the conversion of methane. Towards the end of the layer, where the conversion has already proceeded fairly extensively, the catalytic activity of the catalysts may be greater and it is preferable to employ the highly active catalysts hitherto usual for the conversion of methane. Furthermore by employing several catalysts which are suitable for uniformly distributing the conversion over the whole length of the layer, there is the advantage that no formation of soot takes place and the necessary reaction space may be smaller than when solely employing for example catalysts of low activity. The different catalysts employed according to the present invention need not be arranged in layers sharply separated from each other but may also, for a longer or shorter distance, penetrate each other so that when employing, for example, two catalysts the gases pass through a layer of the first catalyst of lower activity, then through a mixture of this catalyst and a second catalyst of stronger activity, this mixture being of varying composition, and then through a layer of the said second catalyst.

Catalysts which are especially suitable for the conversion of higher molecular hydrocarbons in the first zone of the reaction are obtained, for example, by employing the catalytically active metal (as for example a metal of the iron group) either in an activated form (as for example by the addition of non-reducible oxides of metals from groups 2 to 6 of the periodic system, such as aluminium oxide) but in a smaller concentration, or less strongly activated or in another physical condition in which it exhibits less catalytic activity (as for example in the form of glowed oxides) than in the following zone or zones. By the term "non-reducible oxides" we understand for the purposes of the present invention those oxides which are not reduced by hydrogen at temperatures below 1000° C. However, those carrier substances and additions which readily lead to the formation of soot, as for example silica gel and other gels, must be avoided. The ratio of the amounts of substances comprising a metal of the iron group to the amount of activating addition may be varied within wide ranges. For example to each molecular proportion of nickel from 0.1 to 10 molecular proportions of activator, such as aluminium oxide may be employed. Of particular advantage are catalysts containing equal molecular proportions of iron metal and activating substance. As, however, the more usual activating substances such as magnesia, alumina and bauxite are cheaper than nickel, they are used at the same time as carrier substances and therefore employed in larger amounts.

The activating power of the more usual of the said difficultly reducible oxides decreases in the following order: alumnium oxide magnesium oxide, uranium oxide, cerium oxide, chromium oxide, vanadium oxide, beryllium oxide, calcium oxide, strontium oxide, barium oxide, titanium oxide, molybdenum oxide.

It is especially advantageous to employ in the first part of the reaction chamber catalysts obtained by making up into a paste catalytically active substances, such as those comprising metals of the iron group, together with a hydraulic binding agent, such as cement and allowing the paste to set and at the end of the reaction chamber those obtained by activating catalytic substances by an addition of chromium or vanadium or compounds of the alkali metals, alkaline earth metals or earth metals, such as artificial or natural aluminium compounds containing besides oxygen also at least one of the elements silicon, hydrogen, carbon, boron, phosphorus or sulphur, as is described for example in the British Patents 323,855 and 267,535.

The amounts of catalysts to be employed in any particular case depend on the nature of the gases to be converted. The proportion of the less active catalyst should as a rule be the greater the higher the content of unsaturated hydrocarbons or saturated hydrocarbons of high molecular weight in the initial gases. It may also be preferable to employ more than two catalysts arranged one behind another. As a rule from 600 to 1000 liters of gas to be converted are passed per hour over 1 liter of catalyst space, but also higher or lower velocities may be employed. The process according to the present invention is carried out in practice at temperatures ranging from about 400° to 1000° C., and at ordinary pressure or elevated pressures up to about 150 atmospheres. At elevated pressures temperatures near the upper limit of the aforesaid temperature range are employed.

The following examples will further illustrate the nature of this invention but the invention is not restricted to these examples. The percentages are by volume if not otherwise stated.

Example 1

30 liters of a catalyst prepared by making up into an aqueous paste 25 per cent of precipitated nickel, magnesium and aluminium hydroxides with 75 per cent by weight of alumina cement and 20 liters of a catalyst prepared from precipitated nickel carbonate, kaolin and magnesia are charged into a reaction tube of nicrothermsteel (as for example NCT3) of 15 centimeters internal diameter and 3 meters length, the catalyst prepared with alumina cement forming the beginning of the layer. The tube is heated externally with oxidizing flame gases and 7 cubic meters per hour of a gas having the composition: 85 per cent of saturated hydrocarbons (methane, ethane, propane, butane) 2 per cent of unsaturated hydrocarbons (mainly $C_3H_6$ and $C_4H_8$), 8 per cent of hydrogen, 5 per cent of nitrogen together with 25 kilograms of steam are passed therethrough. With a temperature of from 400° to 700° C. in the first catalytic layer and of from 700° to 750° C. in the second catalytic layer a gas containing about 9 per cent of carbon dioxide, 14 per cent of carbon monoxide, 75 per cent of hydrogen and from 1 to 2 per cent of hydrocarbons and 0.5 per cent of nitrogen is obtained. No soot is formed even after operation for several months.

Example 2

A reaction tube 20 centimeters in width and 4 meters in heated length is charged with 40 liters of a catalyst prepared from precipitated nickel, magnesium and aluminium hydroxides and about 75 per cent by weight of alumina cement, 50 liters of a mass prepared from precipitated nickel and aluminium hydroxides and 60 per cent by weight of alumina cement and finally with 30 liters of the catalyst containing kaolin specified in Example 1. While the tube is heated externally, 40 kilograms of steam and 8.5 cubic meters of a gas having the composition: 87 per cent of saturated hydrocarbons having the mean composition $C_{2.4}H_{6.8}$ (containing from methane to pentane), 5 per cent of unsaturated hydrocarbons, mainly propylene and butylene, 6 per cent of hydrogen and 2 per cent of nitrogen are passed therethrough per hour. At temperatures similar to those in Example 1, about 75 cubic meters per hour of a gas are obtained containing from 60 to 65 cubic meters of hydrogen and carbon monoxide and less than 2 per cent of hydrocarbons. There is no formation of soot.

What we claim is:

1. A process for the production of hydrogen by conversion of a gas comprising a vaporized hydrocarbon having a higher molecular weight than methane which comprises contacting a gas comprising at least one such vaporized hydrocarbon at a temperature between 400° and 1000° C. and in the presence of a gas comprising steam successively with two layers of different catalysts arranged one behind the other and of which the first consists of a composition containing a substance comprising a metal of the iron group which substance is thoroughly distributed in a set hydraulic binding agent, while the following layer which has a higher catalytic activity than the said first layer comprises a mixture of a substance comprising an iron metal with an activating addition of a non-reducible oxide of a metal from groups 2 to 6 of the periodic system, the temperature in each catalyst being lower than in the next following catalyst.

2. A process for the production of hydrogen by conversion of a gas comprising a vaporized hydrocarbon having a higher molecular weight than methane which comprises contacting a gas comprising at least one such vaporized hydrocarbon at a temperature between 400° and 1000° C. and in the presence of a gas comprising steam successively with two layers of different catalysts arranged one behind the other and of which the first consists of a composition containing a substance comprising nickel which substance is thoroughly distributed in a set hydraulic binding agent, while the following layer which has a higher catalytic activity than the said first layer comprises a mixture of a substance comprising nickel with an activating addition of a non-reducible oxide of a metal from groups 2 to 6 of the periodic system, the temperature in each catalyst being lower than in the next following catalyst.

3. A process for the production of hydrogen by conversion of a gas comprising a vaporized hydrocarbon having a higher molecular weight than methane which comprises contacting a gas comprising at least one such vaporized hydrocarbon at a temperature between 400° and 1000° C. and in the presence of a gas comprising steam successively with two layers of different catalysts arranged one behind the other and of which the first consists of a composition containing a substance comprising nickel which substance is thoroughly distributed in a set hydraulic cement comprising alumina, while the following layer which has a higher catalytic activity than the said first layer comprises a mixture of a substance comprising nickel with an activating addition of a non-reducible oxide of a metal from groups 2 to 6 of the periodic system, the temperature in each catalyst being lower than in the next following catalyst.

4. A process for the production of hydrogen by conversion of a gas comprising a vaporized hydrocarbon having a higher molecular weight than methane which comprises contacting a gas comprising methane and at least one such vaporized hydrocarbon at a temperature between 400° and 1000° C. and in the presence of a gas comprising steam successively with two layers of different catalysts arranged one behind the other and of which the first consists of a composition containing a substance comprising nickel which substance is thoroughly distributed in a set hydraulic binding agent, while the following layer which has a higher catalytic activity than the said first layer comprises a mixture of a substance comprising nickel with an activating addition of a non-reducible oxide of a metal from groups 2 to 6 of the periodic system, the temperature in each catalyst being lower than in the next following catalyst.

5. A process for the production of hydrogen by conversion of a gas comprising a vaporized hydrocarbon having a higher molecular weight than methane which comprises contacting a gas comprising at least one such vaporized hydrocarbon at a temperature between 400° and 1000° C. and in the presence of a gas comprising steam successively with two layers of different catalysts arranged one behind the other and of which the first consists of a composition containing a substance comprising a metal of the iron group which substance is thoroughly distributed in a set hydraulic binding agent while the following layer comprises a catalyst of higher catalytic activity than the said first layer.

6. A process for the production of hydrogen by conversion of a gas comprising a vaporized hydrocarbon having a higher molecular weight than methane which comprises contacting a gas comprising at least one such vaporized hydrocarbon at a temperature between 400° and 1000° C. and in the presence of a gas comprising steam successively with two layers of different catalysts arranged one behind the other and of which the first consists of a composition containing a substance comprising a metal of the iron group which substance is thoroughly distributed in a set hydraulic binding agent, while the following layer comprises a catalyst of higher catalytic activity than the first layer and containing a metal of the iron group.

7. The process as defined in claim 3 wherein the nickel catalyst of the first layer contains an activating addition selected from the class consisting of the oxides of aluminum and magnesium.

8. A process for the production of hydrogen by conversion of a gas comprising a vaporized hydrocarbon having a higher molecular weight than methane which comprises contacting a gas comprising at least one such vaporized hydrocarbon at a temperature between 400° and 1000° C. and in the presence of a gas comprising steam successively with two layers of catalyst composed of different components, arranged one behind the other with a mixture of the components of said layers in between, the first layer consisting of a composition containing a substance comprising a metal of the iron group which substance is thoroughly distributed in a set hydraulic binding agent and the following layer, which has a higher catalytic activity than said first layer, comprising a mixture of a substance comprising a metal of the iron group with an activating addition of a non-reducible oxide of a metal selected from groups 2 to 6 of the periodic system, the temperature of the catalyst layers increasing in the direction of the gas current.

GEORG SCHILLER.
GUSTAV WIETZEL.